United States Patent
Robertz et al.

(10) Patent No.: US 6,206,292 B1
(45) Date of Patent: Mar. 27, 2001

(54) SURFACE-PRINTABLE RFID-TRANSPONDERS

(75) Inventors: Bernd Robertz, Julich; Ralf Liebler, Kreuzau, both of (DE)

(73) Assignee: Sihl GmbH (DE)

( * ) Notice: Subject to any disclaimer, the term of this patent is extended or adjusted under 35 U.S.C. 154(b) by 0 days.

(21) Appl. No.: 09/488,488

(22) Filed: Jan. 20, 2000

(30) Foreign Application Priority Data

Jan. 23, 1999 (EP) .............................. 99 101 243

(51) Int. Cl.⁷ .................................. G06K 19/06
(52) U.S. Cl. ............................. 235/488; 235/492
(58) Field of Search .................. 235/492, 380, 235/382, 382.5, 488

(56) References Cited

U.S. PATENT DOCUMENTS

| | | |
|---|---|---|
| 3,078,182 | 2/1963 | Crone, Jr et al. . |
| 4,428,997 | 1/1984 | Shulman .............................. 428/202 |
| 4,903,254 | 2/1990 | Haas ..................................... 368/327 |
| 5,294,290 | 3/1994 | Reeb ..................................... 156/630 |

FOREIGN PATENT DOCUMENTS

| | | | |
|---|---|---|---|
| 38 07 936 A1 | 9/1989 | (DE) | .............................. G08B/13/24 |
| 40 02 738 A1 | 8/1991 | (DE) | .............................. G06K/19/06 |
| 0 595 549 A2 | 5/1994 | (EP) | ................................ H04Q/9/00 |
| 0 595 549 A3 | 5/1994 | (EP) | .............................. G06K/19/07 |
| 0 704 816 A2 | 4/1996 | (EP) | ................................. G06K/7/10 |

*Primary Examiner*—Thien M. Le
(74) *Attorney, Agent, or Firm*—Raymond J. Harmuth, Esq.; Doepken Keevican & Weiss

(57) ABSTRACT

RFID transponders having a polymer film as the support for at least one antenna and having a circuit chip electrically connected thereto, possessing on one surface of the polymer film a printable/writable layer comprising particulate pigment and film forming binder and on the opposite surface of the polymer film an adhesive layer covered with a cover layer. The directly printable RFID transponders are useful as labels, especially pressure-sensitive adhesive labels or tags for labelling goods for transportation, containers or textiles, or else with indetachable cover as identification cards or access authorization cards.

25 Claims, No Drawings

SURFACE-PRINTABLE RFID-TRANSPONDERS

FIELD OF THE INVENTION

The invention is directed to directly printable and/or writable RFID transponders which can be used as labels, tags for transported goods, identification cards and access authorization cards.

BACKGROUND OF THE INVENTION AND PRIOR ART

The use of labels as remotely readable identification tags for baggage items is known. These labels comprise, for example, a flexible substrate on which is formed an antenna having a transponder circuit chip, and adhesive films for joining chip and antenna in the region of the antenna contacts and the chip contacts and also between the transponder, the substrate and a protective sheet. A label of this kind is disclosed in EP-A-595 549.

DE-A-38 07 936 discloses an electronic theft prevention system which operates with a transmitting frequency in the GHz range (approximately 2.5 GHz) in order to allow the dimensions of the passive security element (passive transponder) to be small. The passive security element is combined with the goods label to form a unit. This security system known from DE-A-38 07 936 makes use of a stationary means described in DE-A-40 02 738—for registering and identifying mobile passive radio recording chips, which allows information to be stored in an addressed passive radio recording chip and allows information stored in such a chip to be interrogated at any point in time, all in a controlled manner. The fastening of the passive registration chips to letters, packets, parcels or baggage items is described.

In the case of the known labels or cards with RFID transponders, which have a carrier sheet with circuit chip and antenna disposed thereon, the so-called film transponders are laminated between an upper label material comprising paper or a polymer film and further layers in order to protect chip and antenna against damage. Similar laminate structures are also known for entry cards, travel cards and attachable labels with RFID transponders. These laminates can be printed on the front, and optionally on the reverse as well, using processes typical for the purpose.

The object of the invention is to simplify the construction of labels, tags for transported goods, identification cards, access authorization cards and the like each having an RFID transponder with an antenna and, connected to it, a circuit chip so as to permit their more cost-effective mass production.

SUMMARY OF THE INVENTION

This object is achieved by means of RFID transponders having a printable surface, and comprising (a) a polymer film having two major surfaces opposite to each other as substrate for (b) at least one antenna and a circuit chip electrically connected thereto, both being attached to one of the major surfaces of said polymer film and (c) a printable layer disposed on one surface of said polymer film and (d) an adhesive layer disposed on the opposite major surface of said polymer film and (e) a cover layer adjacent to said adhesive layer to cover the open surface of said adhesive layer and wherein the printable layer comprising particulate pigment and film forming binder to provide the printable surface at the top side of the RFID transponders.

According to another embodiment of the invention the RFID transponders having a printable surface, and comprising (a) a continuous polymer film strip having two major surfaces opposite to each other as substrate for (b) a plurality of RFID transponders, each comprising at least one antenna and a circuit chip electrically connected thereto, both being attached to one of the major surfaces of said polymer film strip and (c) a printable layer disposed on one surface of said polymer film strip and (d) an adhesive layer disposed on the opposite major surface of said polymer film strip and (e) a cover layer adjacent to said adhesive layer to cover the open surface of said adhesive layer and wherein the printable layer comprising particulate pigment and film forming binder to provide the printable surface at the top side of said RFID transponders which are formed at a distance from one another in the running direction of said polymer film strip.

DETAILED DESCRIPTION OF THE INVENTION

The polymer films which are suitable as support or carriers can, for example, be polyester films, polyvinyl chloride films, polyolefin films (poly-propylene, polyethylene), polycarbonate films, polystyrene films, polyamide films or cellulose acetate films. The carrier films have a thickness of preferably from 30 $\mu$m to 820 $\mu$m, with particular preference from 36 $\mu$m to 100 $\mu$m.

The support films can be transparent or opaque and can if desired have a microporous structure. The support films may for their part already be of printable and/or writable configuration. In such a case it is possible, if desired, to omit the application of an additional printable layer.

In order to form flat, especially rectangular, RFID transponders an antenna in one or more turns made from an electrically conductive material is applied to one or both sides of a support or carrier film made of plastic. The antenna is formed on the dielectric polymer carrier film by means of customary measures. The antenna has antenna contacts which are preferably arranged on the carrier film in such a way as to be delimited by the antenna coil. The antenna turn(s) has (have) a thickness of from 10 $\mu$m to 50 $\mu$m.

The circuit chip, which is likewise fastened to the carrier film, has first and second electrical chip contacts in front of an inner zone of the chip surface, and the electrical connection of the chip to the antenna is established preferably by means of electrically conductive adhesive which is arranged between the antenna contacts and the chip contacts.

Preferably, antenna and circuit chip are arranged on the same side of the polymer film. This is especially preferred when the carrier film used is a polymer film which is for its part of directly printable design. In principle, however, antenna and circuit chip and, if desired, capacitors can also be arranged on opposite surfaces of the carrier film. In this arrangement the electrical connection is made through the polymer film.

The printable and/or writable layer of the invention is preferably arranged on that surface of the polymer film on which there is no chip. The printable/writable layer can be opaque or else semitransparent.

The printable layer contains finely divided pigments, examples being inorganic pigments or fillers, such as kaolin, calcium carbonate, silica, silicates, alumina, aluminum hydroxide, zinc oxide, barium sulfate, talc or mixtures thereof. It is also possible, however, to use the organic polymer pigments known for paper coatings, alone or in combination with inorganic pigments, for the printable layer.

Examples of suitable film-forming binders for forming the layer and fastening the pigments to the carrier film are polyvinyl alcohol, polyvinyl-pyrrolidone, casein, starch, starch derivatives, styrene-maleic anhydride copolymers, and also the customary polymer latices known for paper coatings, such as styrene-butadiene copolymers, styrene-acrylic acid copolymers, and acrylic latices. In principle it is also possible to use mixtures of soluble binders with one another or latices with soluble binders or mixtures of latices. It is also possible to use solvent-based coating compositions, with nitrocellulose as binder, for example, for forming the printable layer.

The ratio of pigment to binder is chosen so as to ensure adequate adhesion of the printable layer to the polymer film: however, the layer still has sufficient porosity to be readily printable.
In general, from 5 to 30 parts by weight, preferably up to 20 parts by weight of binder per 100 parts by weight of pigment are sufficient to form a printable and/or writable layer of sufficient strength.

The printable layer may further include customary auxiliaries, such as dispersants, defoamers, crosslinking agents, adhesion promoters, thickeners, dyes and UV stabilisers.

The printable layer preferably has an applied weight (dry) of from 5 g/m$^2$ to 30 g/m$^2$, preferably from 7 g/m$^2$ to 20 g/m$^2$.

In one embodiment of the invention it is further possible to arrange between the carrier film and the printable layer an interlayer which likewise comprises particulate pigments/fillers and binder. The interlayer increases the opacity of the total layer on this side of the carrier film and may also have an insulating effect with respect to heat, or barrier properties for migrating constituents. In principle, the film-forming binders and pigments used for the interlayer can be the same as those used for the printable layer. The interlayer preferably has an applied weight (dry) of from 1 g/m$^2$ to 10 g/m$^2$. In order to improve the adhesion of the interlayer to the polymer film, the interlayer may also include an adhesion promoter in addition to the customary auxiliaries and additives, or the polymer film itself can have an adhesion-promoting surface finish.

In one embodiment of the invention the printable layer is designed as a heat-sensitive recording layer. In this embodiment the printable layer further includes dye precursor compound(s) which when exposed to heat reacts (react) with a suitable acidic partner compound to form a color, and one or more meltable compounds, such as waxes and customary auxiliaries. On exposure to heat, the meltable compounds are intended to assist contact between the color-forming reaction partners.

In another embodiment of the invention, the printable layer is designed as an ink-receiving recording layer for printing by means of the inkjet process. In this embodiment the printable layer may comprise not only pigment(s) and binder(s) but also, preferably, one or more cationic compounds for fixing the dyes of the aqueous/alcoholic inks, examples being cationic acrylates, acrylamides, polydiallyl-dimethylamine chloride, polyallylamines, polydiallylamines, polyimides, quaternary ammonium compounds, and further auxiliaries common in recording layers of this kind.

Owing to the presence of finely divided pigments and binder(s), the printable layer can generally also be printed by other printing techniques that can be performed on demand, such as thermal transfer printing, laser printing, magnetography and dot matrix. The printable layer can also be printed by means of flexographic, offset, gravure and screen printing techniques.

The particular advantage of the directly printable RFID transponders of the invention is that they can be printed directly as and when required using commercially introduced printers in order to form, on the surface, optically readable information corresponding to the desired end use as a label, tag, access authorization card or identification card. In parallel, the same and/or additional information can be stored in the circuit chip in recallable form.

On the surface opposite the printable layer, the carrier film has an adhesive layer. The adhesive layer can have a weight per unit area of from 3 g/m$^2$ to 30 g/m$^2$, preferably from 5 g/m$^2$ to 15 g/m$^2$.

The adhesive layer can be formed from commercially customary hot-melt adhesives or customary laminating adhesives, especially if the cover layer is to be fastened permanently to the carrier film. In this embodiment of the invention the cover layer used is paper or card or a polymer film, in order to enable the printable RFID transponders to be used directly as identification cards, access authorization cards or tags. The basis weight of the paper/board for the cover layer is selected in accordance with the card rigidity required for the intended use. It can be from 50 g/m$^2$ to 250 g/m$^2$, preferably from 70 g/m$^2$ to 120 g/m$^2$.

In another embodiment of the invention, a self-sticking adhesive is used to form the adhesive layer.
Examples of suitable pressure-sensitive adhesives for forming a pressure-sensitive adhesive layer are pressure-sensitively adhering aqueous dispersions based on acrylic acid, acrylate (esters with $C_4$ to $C_8$ alcohols) and/or with acrylate (esters with $C_4$ to $C_8$ alcohols) and copolymers thereof with vinyl acetate, acrylonitrile, diacetone acrylamide and/or crosslinked comonomers (e.g. divinylbenzene or ethylene dimethacrylate with and without modifying resin dispersions (hydrocarbon resins, alkylphenol resins, terpene-phenol resins, betapinene resins, rosins, methylstyrene-vinyltoluene resins), acrylate pressure-sensitive adhesives in solution in organic solvents with, for example, rosin triglyceride resins or hydrogenated rosins as tackifier component, acrylates derivatized by copolymerization with bifunctional monomers, such as divinylbenzene or ethylene dimethacrylate, or by Copolymerisation with UV photoinitiators (e.g. benzophenone groups), radiation-crosslinkable pressure-sensitive hot-melt adhesives based on acrylate, pressure-sensitive hot-melt adhesives based on isobutyleneisoprene, isobutylene-butadiene or ethylene-butadiene or block copolymers comprising styrene (SIS-SB, SBS and SE/BS copolymers) with the addition of tackifier resins, e.g. aliphatic olefin resins, rosins or terpene-phenol resins or polyaromatic compounds, or petroleum-spirit-dissolved pressure-sensitive adhesives based on natural rubber, with coumarone-indene resins, rosins or hydrocarbon resins (e.g. polyterpenes or poly-beta-pinene) as tackifiers.

The pressure-sensitive adhesive layer is covered with a redetachable cover layer in order to allow the printable RFID transponders to be used directly, following the removal of the cover layer, as self-adhesive labels for marking goods for transport, textiles or containers.

Detachable cover layers of this kind for protecting the pressure-sensitive adhesive layer until its end use can be so-called release papers, i.e. papers having at least one surface finished in such a way that on contact with the pressure-sensitive adhesive a connection is formed which, however, can be broken again without adversely affecting the adhesion of the pressure-sensitive adhesive layer.

Suitable release papers are those having a surface layer on the facing side which can comprise, as release agents:

polymers based on cellulose acetate, (meth)acrylates, acrylonitrile, vinyl chloride, vinyl ethers or copolymers thereof with, for example, maleic anhydride or modified with aldehyde resins or imine resins; waxes based on polyethyleneamides or polyamides and/or mixtures thereof with polymers based on nitrocellulose, polystyrene or vinyl chloride-vinyl acetate copolymers; polyvinyl esters with long-chain alcohols; chromium stearates and derivatives based thereon; and crosslinked polyorganosiloxanes, alone or in a mixture with vinyl ethers and/or maleic anhydride polymers.

Silicone-containing release layers are applied to a suitable carrier material from solutions in organic solvents or from aqueous emulsion, or as liquid polyorganosiloxanes, and are subsequently crosslinked. Crosslinking can be performed by means of catalyzed condensation, by an addition reaction, such as hydrosilylation, or by means of UV rays or electron beams (EBC).

The printable layer, the interlayer (if present) and the adhesive layer can be applied to the carrier film by customary techniques known for this purpose. In the case of pressure-sensitive adhesive layers, and especially when these are to be applied from organic solvents, it is preferred to form a pressure-sensitive adhesive layer on the cover layer which has been provided with a release effect (abhesive property) and then to bring the polymer carrier film with the RFID transponders formed thereon into contact with the pressure-sensitive adhesive layer.

In one embodiment of the invention a continuous polymer film strip is used as the carrier for forming the RFID transponders. A large number of RFID transponders each with antenna and chip are formed on the strip in the running direction of the strip. It is also possible to use a wider film strip and to provide rows, parallel to and at a small distance from one another, with a large number of RFID transponders in the running direction of the strip.

In these embodiments, adhesive layer and cover layer are preferably fastened continuously to one of the surfaces of the polymer film strip. The RFID transponders are preferably formed at a distance from one another in the running direction of the strip.

The printable layer on the opposite surface of the carrier film can likewise be formed continuously. An alternative possibility is to apply the printable layer in each case only in the region of the RFID transponders and to leave those zones of the strip located between the RFID transponders arranged at a distance from one another in the running direction of the strip, and any rows of RFID transponders present, free from the printable layer.

This configuration of the printable layer, with interruptions between each of the RFID transponders, has the advantage that, when the layer is printed, sensors detect the beginning and end of the respective RFID transponder in the strip and can control the in-register printing of the RFID transponders.

In one embodiment of a continuous RFID transponder strip it is preferred to form at least one pre-prepared parting line as an intended separation point between the RFID transponders transversely to the running direction of the strip, in order to facilitate the separation of printed or unprinted RFID transponders from the strip.

Such intended separation points between the printable RFID transponders of the strip can have various configurations. For example, between adjacent RFID transponders transversely to the running direction of the strip there may be perforations in the film strip which render the intended separation points visible and facilitate the separation of individual units. As already described, the individual RFID transponders are preferably not formed directly adjoining one another on the carrier film, but instead individually, so that neighboring RFID transponders are at a distance from one another on the carrier film in the running direction of the strip. In order to assist complete separation of the carrier film at such intended separation points, the cover layer may be additionally perforated and/or punched. Such formation of intended separation points is particularly preferred if the film strip is to have sites of engagement for strip conveyor elements and/or if the film strip is to be processed for stacking with zigzag folding. Such perforations also have advantages, however, if the film strip is to be processed into rolls.

In the case of the embodiments of the printable RFID transponders in strip form with a row of a large number of RFID transponders, the strip width can be from 45 mm to 100 mm. In the case of smaller webs, the rectangular RFID transponders are formed in the longitudinal direction of the strip. Wider webs are required when the rectangular RFID transponders are formed transversely to the running direction of the strip.

The strip width is adapted to the commercial printers which carry out the printing, directly and as and when required, of labels or access authorization cards.

The invention is elucidated further by the following examples.

EXAMPLE 1

A polymer film transponder strip is used comprising a transparent 48 mm wide and 36 $\mu$m thick PETP film applied to both sides of which there are antenna structures made of aluminum which are in electrical connection with a circuit chip arranged on the polymer film. In a finishing machine, the polymer film strip is processed from the roll and, by means of a first gravure roller, a coating composition which is capable of forming a heat-insulating interlayer and comprises organic hollow-body pigments and customary film-forming binders and auxiliaries is applied in the form of an aqueous dispersion. After drying with the aid of IR lamps, a coating composition is applied with a second gravure roller and a heat-sensitive layer is formed which comprises color formers and developers in addition to film-forming binders and pigment. The printable layer is applied congruently to the interlayer and dried at a maximum surface temperature of 55° C.

The coating weight (dry) of the interlayer is 3–5, preferably 5 g/m$^2$; the applied weight of the heat-sensitive recording layer is 5–7, preferably 7 g/m$^2$.

The coating area is in each case 48 mm×90 mm, and an uncoated region with a length of 6 mm in each case is left between the individual RFID transponders.

In a laminating station, a cover layer consisting of silicone release paper coated beforehand with a hot-melt pressure-sensitive adhesive and having a basis weight of 67 g/m$^2$ is laminated on. Finally, the surface provided with a printable layer is pre-punched down to the silicone paper acting as the cover layer, punching taking place from the top face, i.e. from the printable layer, so forming intended separation points between the individual printable RFID transponders transversely to the running direction of the strip.

The strip is processed to give rolls containing in each case 200 printable RFID transponders which are intended for use as directly printable pressure-sensitive adhesive labels.

The RFID transponders which can be printed directly using commercially customary thermal printers exhibit excellent contrast when the color is formed by exposure to heat;

printed bar codes can be read without problem. The pressure-sensitive adhesive labels, measuring 96×48 mm, can be applied directly as labels for goods for transportation.

By means of additional devices it is possible when printing to provide the individual RFID transponders not only with the bar code but also with wirelessly, remotely readable information, it being possible to store not only the optically readable information but also additional, remote-readable information in the label.

EXAMPLE 2

An RFID transponder on a 48 mm wide and 96 µm thick transparent PETP film with antenna and chip applied to one side is provided on its unoccupied surface with a recording layer which can be printed by the inkjet technique. The layer contains polyvinyl alcohol as film-forming binder and silica as pigment. The applicator unit used is a jet applicator unit. The applied weight (dry) is 9 g/m$^2$.

After drying and application of a silicone paper, coated with a pressure-sensitive dispersion adhesive, to the opposite side, the label size of 85 mm×48 mm, and pre-prepared intended separation points, are formed by cutting through the printable layer and the carrier film and the adhesive down to the cover layer between the RFID transponders, in each case transversely to the running direction of the strip.

The RFID transponders printable directly by means of inkjet techniques and intended for use as pressure-sensitive adhesive labels can be color-printed with commercially customary inkjet printers. At the same time or subsequently, the desired additional information can be input into the circuit chip and called up remotely again at a subsequent, desired point in time.

The labels are intended for distinguishing books and for labelling files and, through call-up of the stored information, permit contactless monitoring of movements of books and files, respectively, within controlled areas.

EXAMPLE 3

An RFID transponder strip with a structure corresponding to that of the RFID transponder strip used in Example 1, with a width of 48 mm, is first of all coated on one side with an interlayer which is colored a neutral grey. Subsequently, a printable layer of pigment(s) and film-forming binder(s) and customary auxiliaries is formed which accepts customary laser printer toners.

The application technique used for the printable recording layer is screen printing. Regions measuring 48 mm×96 mm are printed congruently. The applied weight of the interlayer is 6 g/m$^2$, that of the printable toner-accepting layer 5 g/m$^2$.

The RFID transponder film strip coated on one side is provided on the reverse with a laminating adhesive and a 75 µm thick opaque white PETP film cover layer. The printable layer is printed partially by means of flexographic printing techniques.

After cutting to a size of 48 mm×96 mm, the RFID transponders obtained in this way, already partially printed on the facing side, can be printed as and when required using a laser printer, in addition to the partial printing, with excellent quality, as entry cards, and desired remote-readable information can be stored in the circuit chip at the same time.

EXAMPLE 4

The strip-form film RFID transponder of Example 2 is provided on the unoccupied side with a printable layer comprising kaolin as pigment and polystyrene/butadiene latex as binder and on the other side is covered, by means of a laminating adhesive, with a 50 µm opaque white PETP film cover layer. After labels measuring 86 mm×48 mm have been cut and perforated, they can be used as textile tagging labels printable by the thermal transfer technique. These labels too can be provided with remote-readable information in the storage chip, in addition to the optically readable information applied by thermal transfer printing, so enabling contactless monitoring of the whereabouts of the textiles provided with such a tagging label within controlled areas.

What is claimed is:

1. An RFID transponder comprising:
   (a) a polymer film having a first surface and a second surface which oppose each other and act as a substrate for receiving at least one antenna and a circuit chip electrically connected thereto such that said antenna and said circuit chip are attached to one of the surfaces of said polymer film;
   (b) a printable layer disposed on the first surface of said polymer film wherein the printable layer has a particular pigment and a film forming binder disposed thereon to provide a printable surface;
   (c) one side of an adhesive layer disposed on the second surface of said polymer film; and
   (d) a cover layer disposed on a second side of the adhesive layer opposite to the one side of the adhesive layer disposed on the second surface of said polymer film.

2. The RFID transponder according to claim 1, wherein the adhesive layer comprises a self-sticking adhesive and the cover layer comprises a release paper wherein at least one side of the release paper contains a release agent which facilitates removal of the release paper from the self-sticking adhesive.

3. The RFID transponder according to claim 2, wherein the RFID transponder is selected from the group consisting of a self-adhesive label and a self-adhesive tag.

4. The RFID transponder according to claim 1, wherein the adhesive layer is selected from the group consisting of a holt-melt adhesive and a laminating adhesive and the cover layer is selected from the group consisting of a paper/board and a polymer film which are inseparable from said adhesive layer.

5. The RFID transponder according to claim 4, wherein the RFID transponder is selected from the group consisting of an identification card and an access authorization card.

6. The RFID transponder according to claim 2, wherein the printable layer is configured such that it acts as a heat-sensitive recording layer which develops one or more visible colors on exposure to heat.

7. The RFID transponder according to claim 2, wherein the printable layer is configured such that it acts as an ink-accepting layer in accordance with inkjet technology.

8. The RFID transponder according to claim 2, wherein the printable layer is configured such that material may be printed thereon by a means for printing wherein the means for printing is selected from the group consisting of transfer printing, laser printing, offset printing, flexographic printing, gravure printing, and screen printing.

9. The RFID transponder according to claim 4, wherein the printable layer is configured such that it acts as a heat-sensitive recording layer which develops one or more colors on exposure to heat.

10. The RPID transponder according to claim 4, wherein the printable layer is configured such that it acts as an ink-accepting layer in accordance with inkjet technology.

11. The RFID transponder according to claim 4, wherein the printable layer is configured such that material may be printed thereon by a means for printing wherein the means for printing is selected from the group consisting of transfer printing, laser printing, offset printing, flexographic printing, gravure printing, and screen printing.

12. The RFID transponder according to claim 1, wherein the polymer film is transparent and an opaque interlayer is sandwiched between the transparent polymer film and the printable layer.

13. A plurality of RFID transponders comprising:
   (a) a continuous polymer film strip in a running direction having a first surface and a second surface which oppose each other and act as a substrate for receiving at least one antenna and a circuit chip electrically connected thereto such that said antenna and said circuit chip is attached to one of the surfaces of said polymer film strip;
   (b) a printable layer disposed on the first surface of said polymer film strip wherein the printable layer has a particulate pigment and a film forming binder disposed thereon to provide a printable surface;
   (c) one side of an adhesive layer disposed on the second surface of said polymer film strip;
   (d) a cover layer disposed on a second side of the adhesive layer opposite to the one side of the adhesive layer disposed on the second surface of said polymer film strip; and
   (e) wherein said RFID transponders are formed at a distance from one another in the running direction of said polymer film strip.

14. The plurality of RFID transponders according to claim 13, wherein at least one prepared parting line is formed between the RFID transponders transversely to the running direction of the polymer film strip to allow separation of the RFID transponders from said polymer film strip.

15. The plurality of RFID transponders according to claim 14, wherein the adhesive layer comprises a self-sticking adhesive and the cover layer comprises a release paper wherein at least one side of the release paper contains a release agent which facilitates removal of the release paper from the self-sticking adhesive.

16. The plurality of RFID transponders according to claim 15, wherein the RFID transponders are selected from the group consisting of a self-adhesive label and a tag.

17. The plurality of RFID transponders according to claim 14, wherein the adhesive layer is selected from the group consisting of a holt-melt adhesive and a laminating adhesive and the cover layer is selected from the group consisting of a paper/board and a polymer film which are inseparable from said adhesive layer.

18. The plurality of RFID transponders according to claim 17, wherein the RFID transponders are selected from the group consisting of an identification card and an access authorization card.

19. The plurality of RFID transponders according to claim 15, wherein the printable layer is configured such that it acts as a heat-sensitive recording layer which develops one or more visible colors on exposure to heat.

20. The plurality of RFID transponders according to claim 15, wherein the printable layer is configured such that it acts as an ink-accepting layer in accordance with inkjet technology.

21. The plurality of RFID transponders according to claim 15, wherein the printable layer is configured such that material may be printed thereon by a means for printing wherein the means for printing is selected from the group consisting of transfer printing, laser printing, offset printing, flexographic printing, gravure printing, and screen printing.

22. The plurality of RFID transponders according to claim 17, wherein the printable layer is configured as a heart-sensitive recording layer which develops one or more visible colors on exposure to heat.

23. The plurality of RFID transponders according to claim 17, wherein the printable layer is configured such that it acts as an ink-accepting layer in accordance with inkjet technology.

24. The plurality of RFID transponders according to claim 17, wherein the printable layer is configured such that material may be printed thereon by a means for printing wherein the means for printing is selected from the group consisting of transfer printing, laser printing, offset printing, flexographic printing, gravure printing, and screen printing.

25. The plurality of RFID transponders according to claim 13, wherein the polymer film strip is transparent and an opaque interlayer is sandwiched between the transparent polymer film strip and the printable layer.

* * * * *